United States Patent
Yamamoto

(10) Patent No.: US 12,078,262 B2
(45) Date of Patent: Sep. 3, 2024

(54) OPERATION VALVE

(71) Applicant: FUMOTO GIKEN CO., LTD., Kanagawa (JP)

(72) Inventor: Ryohei Yamamoto, Miura-gun (JP)

(73) Assignee: FUMOTO GIKEN CO., LTD., Kanagawa (JP)

( * ) Notice: Subject to any disclaimer, the term of this patent is extended or adjusted under 35 U.S.C. 154(b) by 0 days.

(21) Appl. No.: 18/084,176

(22) Filed: Dec. 19, 2022

(65) Prior Publication Data
US 2023/0220927 A1 Jul. 13, 2023

(30) Foreign Application Priority Data
Jan. 12, 2022 (JP) .................................. 2022-003127

(51) Int. Cl.
| | |
|---|---|
| *F16K 3/26* | (2006.01) |
| *F16K 27/04* | (2006.01) |
| *F16K 31/50* | (2006.01) |

(52) U.S. Cl.
CPC .............. *F16K 31/508* (2013.01); *F16K 3/26* (2013.01); *F16K 27/041* (2013.01)

(58) Field of Classification Search
CPC .......... F16K 31/508; F16K 31/50; F16K 3/26; F16K 3/262
See application file for complete search history.

(56) References Cited

U.S. PATENT DOCUMENTS

| | | | | |
|---|---|---|---|---|
| 1,833,629 A | * | 11/1931 | Yarnall ..................... | F16K 3/26 251/266 |
| 1,868,811 A | * | 7/1932 | Yarnall ..................... | F16K 3/26 251/363 |
| 3,159,378 A | * | 12/1964 | Haag ........................ | F16K 3/26 251/63 |
| 4,856,756 A | * | 8/1989 | Combs ...................... | F16K 3/26 166/332.6 |
| 2008/0149874 A1 | * | 6/2008 | Fukano ..................... | F16K 7/16 137/551 |
| 2015/0345659 A1 | | 12/2015 | Yamamoto | |
| 2017/0328253 A1 | | 11/2017 | Kizawa | |
| 2018/0202574 A1 | * | 7/2018 | Morris ..................... | F16K 1/04 |
| 2021/0220764 A1 | | 7/2021 | Azuma | |
| 2022/0003326 A1 | * | 1/2022 | Hagen .................. | F16K 27/041 |

FOREIGN PATENT DOCUMENTS

| | | |
|---|---|---|
| JP | H05-083560 U | 11/1993 |
| JP | 2003-020936 A | 1/2003 |
| JP | 2016-006346 A | 1/2016 |
| JP | 2017-089389 A | 5/2017 |
| WO | 2016/092665 A1 | 6/2016 |
| WO | 2018/179342 A1 | 10/2018 |

* cited by examiner

*Primary Examiner* — Kelsey E Cary
(74) *Attorney, Agent, or Firm* — Kratz, Quintos & Hanson, LLP

(57) ABSTRACT

An operation valve includes a valve formed into a rod shape and including a barrel portion in which a flow path for a fluid is provided, a head portion in which an inlet of the flow path is provided, and a leg portion in which an outlet of the flow path is provided, a housing body housing the barrel portion, and an operation dial screw coupled to the housing body and moving the valve in an extension direction of the valve.

11 Claims, 8 Drawing Sheets

FIG. 6A
FIG. 6B
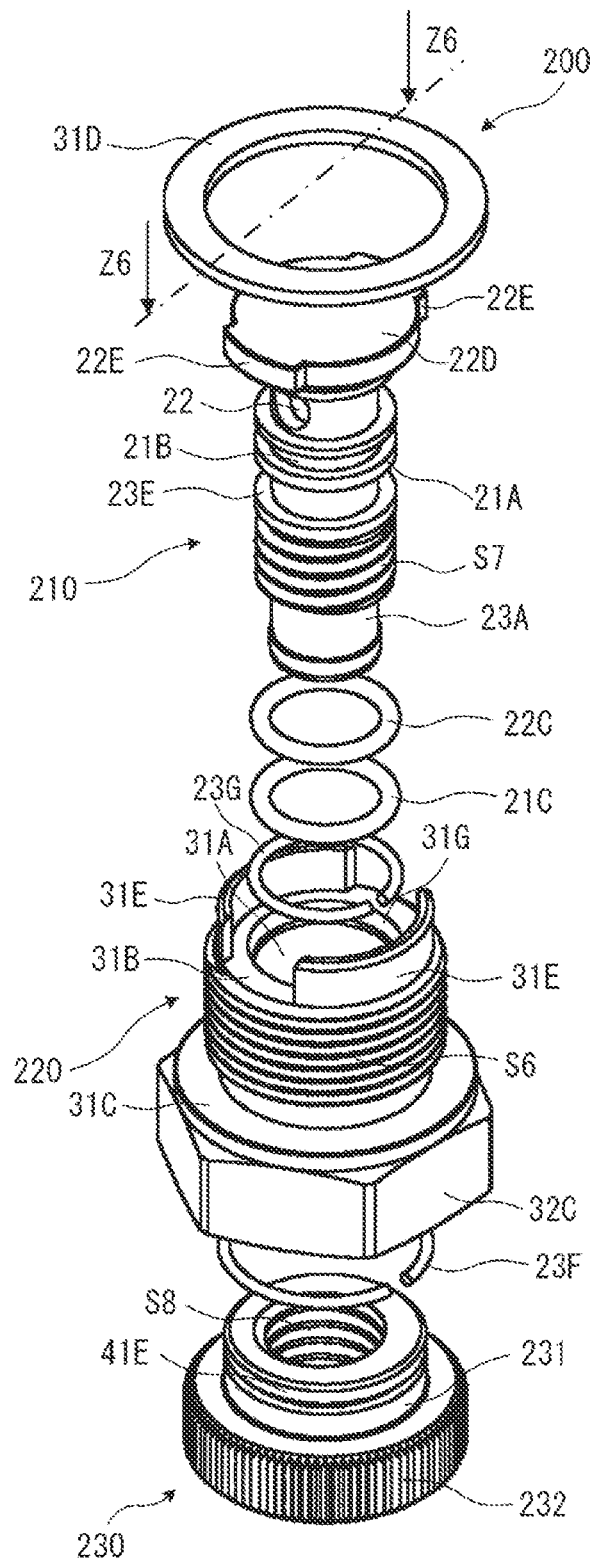
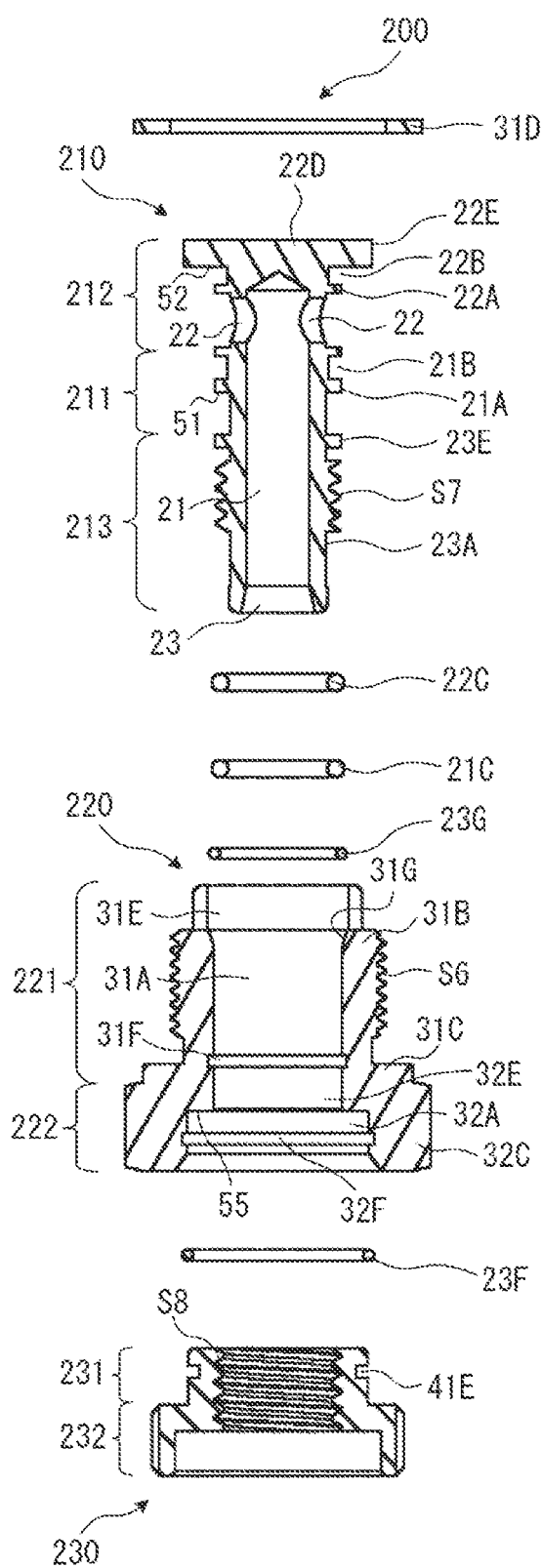

OPERATION VALVE

CROSS-REFERENCE TO RELATED APPLICATION

This application is based upon and claims the benefit of priority of the prior Japanese Patent Application No. 2022-003127, filed on Jan. 12, 2022, the entire contents of which are incorporated herein by reference.

TECHNICAL FIELD

The present disclosure relates to an operation valve.

BACKGROUND

There are known various vehicles and machines equipped with diesel engines. For example, there are known construction machines such as hydraulic excavators and wheel loaders, transport vehicles such as buses, cargo trucks, dump trucks, and on-road trucks, stationary power generators, and the like (see, for example, WO 2016/092665). As an exhaust gas purification system for purifying NOx in exhaust gas of a diesel engine, there is also known a selective catalytic reduction (SCR) system that reduces NOx to nitrogen and water by use of urea water as a reducing agent (see, for example, Japanese Unexamined Patent Application Publication No. 2017-089389).

A urea water tank for storing the above-described urea water is also known. A screw hole and a drain plug for discharging urea water are provided in a lower surface portion of the urea water tank. By removing the drain plug from the screw hole, urea water in the urea water tank is discharged (see, for example, WO 2018/179342). It is known that urea water freezes at around −10 Celsius degrees (see, for example, Japanese Unexamined Patent Application Publication No. 2003-020936).

When a urea water tank is mounted on a large construction machine, a large urea water tank that stores 30 to 150 L (liters) of urea water is often mounted. When the quality check of urea water stored in such a urea water tank is performed, if the drain plug is removed, a large amount of urea water is ejected, which is inconvenient for the quality check.

For this reason, an operation valve may be attached to the urea water tank instead of the drain plug. The operation valve adjusts the flow rate of urea water. By attaching the operation valve to the urea water tank, a small amount of urea water of about 200 to 500 mL (milliliter) is extracted for quality check.

As the operation valve, for example, an operation valve provided with a valve chamber housing a ball valve which is a spherical valve body is known (see, for example, Japanese Unexamined Utility Model Application Publication No. 5-083560). In addition, when the ball valve is closed, liquid accumulates in the valve chamber. there is also known a technique in which crushing of the ball valve or the like is avoided and failure of the operation valve is prevented, even if the volume of the liquid accumulated in the valve chamber expands due to freezing (see, for example, Japanese Unexamined Patent Application Publication No. 2016-006346).

When the above-described technique employs the operation valve including the ball valve, even if the operation valve is used in a cold district and the volume of the urea water expands due to freezing, it is possible to prevent failure of the operation valve. However, when the above-described technique employs the operation valve, the structure of the operation valve might be complicated, so the product cost of the operation valve might increase.

SUMMARY

An object of the present disclosure is to provide an operation valve comprising: a valve formed into a rod shape and including a barrel portion in which a flow path for a fluid is provided, a head portion in which an inlet of the flow path is provided, and a leg portion in which an outlet of the flow path is provided; a housing body housing the barrel portion; and an operation dial screw coupled to the housing body and moving the valve in an extension direction of the valve.

BRIEF DESCRIPTION OF THE DRAWINGS

FIG. 6A is an example of an exploded perspective view of the operation valve according to the second embodiment;

FIG. 6B is an example of an exploded cross-sectional view, taken along a line Z6-Z6, of the operation valve according to the second embodiment;

DETAILED DESCRIPTION

Hereinafter, embodiments of the present disclosure will be described with reference to the drawings.

First Embodiment

Figure 1A:
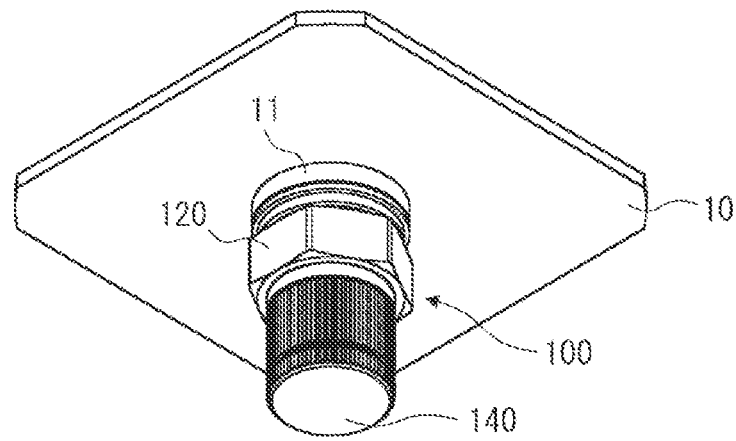
FIG. 1A is a first perspective view illustrating an example of a valve closed state of an operation valve according to a first embodiment attached to a bottom wall of a urea water tank.
Figure 1B:
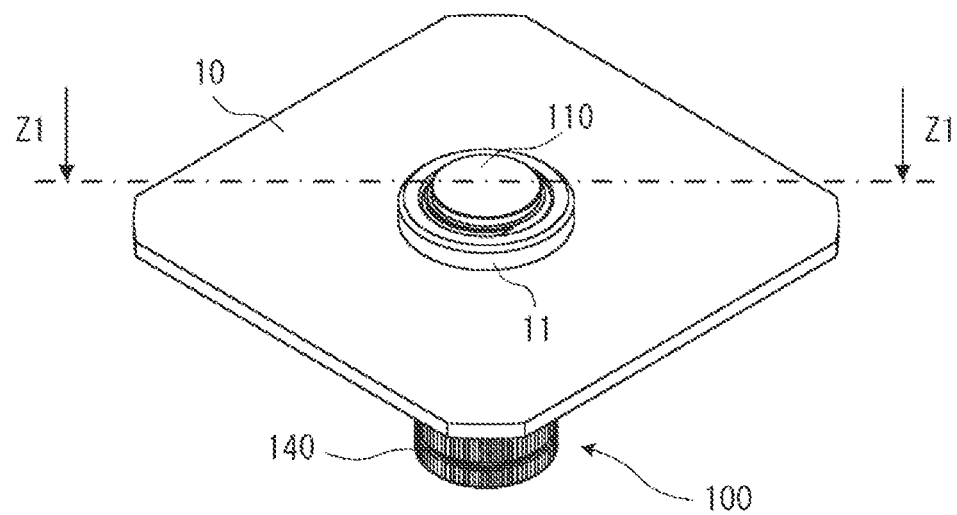
FIG. 1B is a second perspective view illustrating an example of the valve closed state of the operation valve according to the first embodiment attached to the bottom wall of the urea water tank.
Figure 1C:
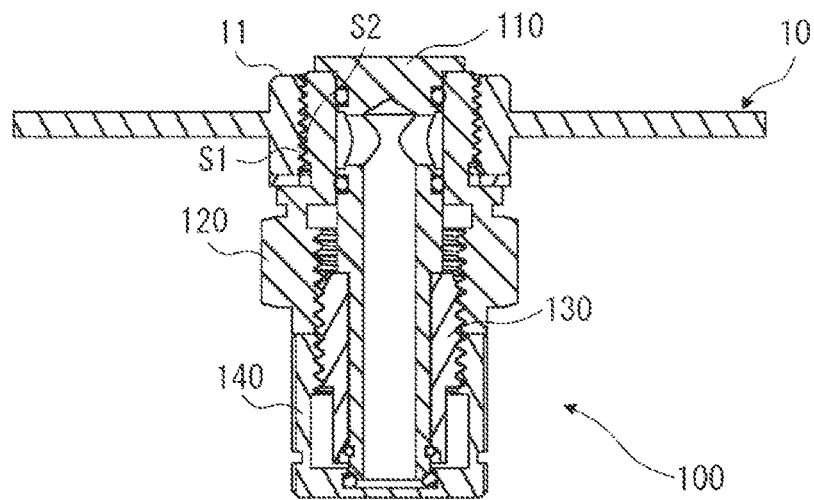
FIG. 1C is a cross-sectional view taken along a line Z1-Z1 and illustrating an example of the valve closed state of the operation valve according to the first embodiment attached to the bottom wall of the urea water tank.

As illustrated in FIGS. 1A to 1C, an operation valve 100 according to the first embodiment is attached to a drain port 11 provided in a bottom wall 10 of a urea water tank. FIGS. 1A to 1C illustrate a part of the bottom wall 10 of the urea water tank. The urea water tank is a container for storing urea water. The drain port 11 is an opening for discharging urea water stored in the urea water tank. Urea water is an example of the fluid and is an aqueous solution in which urea is dissolved in water. Urea water is used as a reducing agent for purifying NOx in exhaust gas from a diesel engine mounted on a construction machine, a transport vehicle, or the like. As illustrated in FIG. 1C, a female screw S1 is provided on the inner circumference of the drain port 11.

The operation valve 100 includes a valve (hereinafter referred to as a stick valve) 110 having a rod shape, a valve body 120, an operation dial 130, and a protective cap 140. The valve body 120 is an example of a housing body, and houses a trunk portion of the stick valve 110. A male screw S2 is provided on the outer peripheral surface of the distal end portion of the valve body 120. The male screw S2 is screw coupled with the female screw S1 of the drain port 11. Thus, the operation valve 100 is mechanically attached to the bottom wall 10 of the urea water tank.

The operation valve 100 will be described in detail with reference to FIG. 2.

Figure 2A:
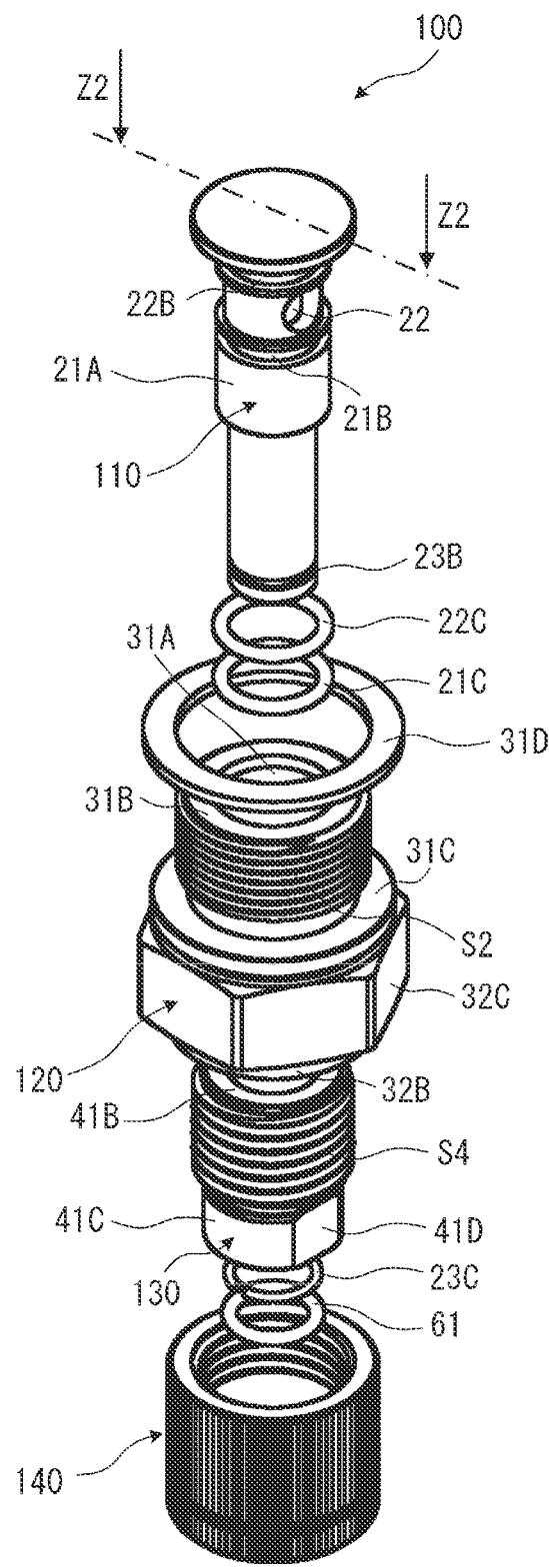
FIG. 2A is an example of an exploded perspective view of the operation valve according to the first embodiment.
Figure 2B:
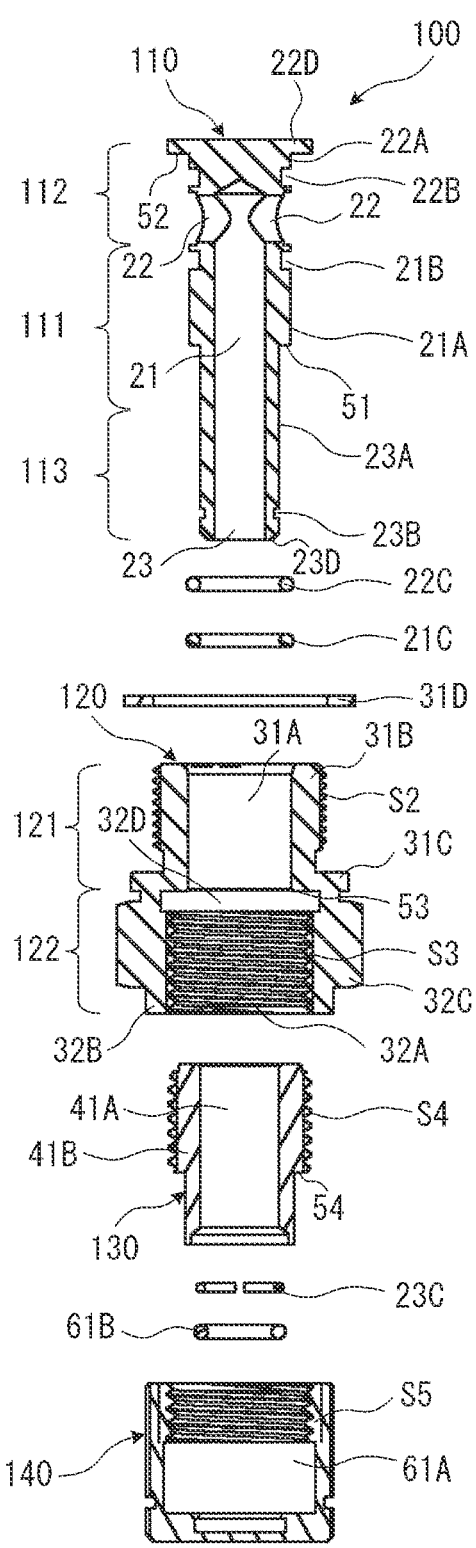
FIG. 2B is an example of an exploded cross-sectional view, taken along a line Z2-Z2, of the operation valve according to the first embodiment.

As illustrated in FIGS. 2A and 2B, the stick valve 110 integrally includes a barrel portion 111, a head portion 112, and a leg portion 113. The head portion 112 is located directly above the barrel portion 111. The leg portion 113 is located immediately below the barrel portion 111. That is, the barrel portion 111 is sandwiched between the head portion 112 and the leg portion 113. As illustrated in FIG. 2A, the stick valve 110 has a cylindrical shape.

A flow path 21 for urea water is provided inside the barrel portion 111. As will be described in detail later, the flow path 21 is also provided inside the leg portion 113. The flow path 21 extends in the same direction as the extension direction of the stick valve 110. A ring groove 21B circulating in the circumferential direction is provided on a barrel side surface 21A located at the front end of the barrel portion 111. An O-ring 21C is attached to the ring groove 21B.

The O-ring 21C is an example of a first sealing ring, and seals the valve body 120 from urea water. The O-ring 21C makes it difficult for urea water to enter the valve body 120. The rear end of the barrel portion 111 has an outer diameter smaller than an outer diameter of the front end of the barrel portion 111. That is, there is a step 51 between the rear end of the barrel portion 111 and the front end of the barrel portion 111. The step 51 may be the same as or different from the ring groove 21B in depth.

The head portion 112 is provided with an inlet 22 of the flow path 21. The inlet 22 is provided on a head side surface 22A of the head portion 112. The head side surface 22A is provided with a ring groove 22B extending in the circumferential direction. An O-ring 22C is attached to the ring groove 22B. The O-ring 22C is an example of a second sealing ring, and seals the valve body 120 from urea water. The two O-rings 21C and 22C make it difficult for urea water to enter the inside of the valve body 120. That is, it is possible to prevent or suppress the infiltration of urea water into the valve body 120. A canopy portion 22D having a disc shape is provided at the front end of the head portion 112. The canopy portion 22D has an outer diameter that is greater than the outer diameter of the rear end of the head portion 112. Therefore, there is a step 52 between the front end of the head portion 112 and the rear end of the head portion 112.

The flow path 21 of the barrel portion 111 extends inside the leg portion 113. The side surface of the leg portion 113 is continuous to the side surface of the rear end of the barrel portion 111 without a step. An outlet 23 of the flow path 21 is provided on a bottom surface of the leg portion 113. A ring groove 23B extending in the circumferential direction is provided in a leg side surface 23A located at the rear end of the leg portion 113. A C-ring 23C is attached to the ring groove 23B. The C-ring 23C is an example of a coupling ring, and couples the leg portion 113 and the operation dial 130.

The valve body 120 integrally includes a valve housing portion 121 and a dial housing portion 122. The valve housing portion 121 has a first cavity portion 31A having a cylindrical shape and extending in the same direction as the central axis direction of the valve body 120. That is, the valve housing portion 121 has a cylindrical shape. For this reason, the valve housing portion 121 has a partition wall 31B that separates the inside and the outside of the valve housing portion 121. The inside diameter of the partition wall 31B is substantially the same as the outside diameter of the barrel side surface 21A. Therefore, the barrel portion 111 of the stick valve 110 is inserted into the first cavity portion 31A. A male screw S2 is provided at the front end of the outer peripheral surface of the partition wall 31B. As described above, the male screw S2 is screw coupled to the female screw S1 of the drain port 11.

A gasket mounting portion 31C is provided at the rear end of the partition wall 31B. A gasket 31D having a ring shape is mounted on the gasket mounting portion 31C. Accordingly, it is possible to suppress leakage of urea water when the operation valve 100 is attached to the urea water tank. Instead of the gasket 31D, an O-ring may be used.

The inside of the dial housing portion 122 has a second cavity portion 32A and a third cavity portion 32D each having a cylindrical shape extending in the same direction as the central axis direction of the valve body 120. The third cavity portion 32D is located at the distal end of the dial housing portion 122. That is, the third cavity portion 32D is located immediately below the first cavity portion 31A. The second cavity portion 32A has an inside diameter greater than an inside diameter of the first cavity portion 31A. The third cavity portion 32D has an inside diameter greater than an inside diameter of the second cavity portion 32A. Therefore, the third cavity portion 32D has the inside diameter greater than the inside diameter of the first cavity portion 31A.

The dial housing portion 122 has a cylindrical shape. For this reason, the dial housing portion 122 has a partition wall 32B that separates the inside and the outside of the dial housing portion 122. Since the third cavity portion 32D has an inner diameter larger than that of the first cavity portion 31A, there is a step 53 between the partition wall 32B of the dial housing portion 122 and the partition wall 31B of the valve housing portion 121.

A female screw S3 is provided on an inner peripheral surface of the partition wall 32B so as to extend circumferentially. A bolt portion 32C having a hexagonal shape is provided integrally with the partition wall 32B at a partition wall central portion located between the front end and the rear end of the partition wall 32B. The valve body 120 is attached to the bottom wall 10 of the urea water tank by holding the bolt portion 32C with two fingers and rotating the valve body 120 clockwise. If necessary, the bolt portion 32C may be gripped by a tool such as a hexagonal spanner to rotate the valve body 120 clockwise.

The inside of the operation dial 130 includes a fourth cavity portion 41A having a cylindrical shape extending in the same direction as the central axis direction of the operation dial 130. That is, the shape of the operation dial 130 is cylindrical. For this reason, the operation dial 130 has a partition wall 41B that separates the inside and the outside of the operation dial 130. The inner peripheral surface of the partition wall 41B has the same inside diameter at one end and the other end. That is, the fourth cavity portion 41A has the same inside diameter from one end to the other end. The rear end of the barrel portion 111 and the leg portion 113 of the stick valve 110 are inserted into the fourth cavity portion 41A. The outer diameters of the rear end of the barrel portion 111 and the outer peripheral surface of the leg portion 113 of the stick valve 110 are substantially the same as the inside diameter of the inner peripheral surface of the partition wall 41B. When the stick valve 110 is inserted into the fourth cavity portion 41A, the step 51 prevents the insertion of the distal end of the barrel portion 111, and the step 51 comes into contact with the top surface of the partition wall 41B of the operation dial 130.

The outer peripheral surface of the partition wall 41B has different outer diameters at one end and the other end. One end of the partition wall 41B has an outer diameter greater than the outer diameter of the other end of the partition wall 41B. For this reason, the partition wall 41B has a step 54 on the outer peripheral surface. The outside diameter of the partition wall 41B is substantially the same as the inside diameter of the partition wall 32B of the dial housing portion 122. A male screw S4 is provided at one end of the outer peripheral surface of the partition wall 41B. Therefore, one end of the operation dial 130 is screw coupled to the second cavity portion 32A of the valve body 120.

As illustrated in FIG. 2A, the outer peripheral surface of the other end of the operation dial 130 includes a pair of curved surfaces 41C facing each other and a pair of flat surfaces 41D facing each other. The screw connection between the valve body 120 and the operation dial 130 is tightened or loosened by holding the pair of flat surfaces between two fingers and rotating the operation dial 130.

The protective cap 140 is a cap that protects the dial side surface and the dial bottom surface of the operation dial 130 from adhesion of foreign matter or water droplets. The foreign matter includes, for example, sand and dust. Examples of the water droplets include urea water and rainwater. When the foreign matter adheres, there is a possibility that the rotation of the operation dial 130 becomes difficult. In addition, even if the water droplets adhere and freeze, there is a possibility that the rotation of the operation dial 130 becomes difficult. The protective cap 140 prevents the operation dial 130 from being exposed, and suppresses adhesion of foreign matter and water droplets. As a result, the operability of the operation dial 130 is improved. The protective cap 140 also prevents the operation dial 130 from being damaged by contact with a tool, for example.

Inside the protective cap 140, a long hole portion 61A having a columnar shape and extending in the same direction as the central axis direction of the protective cap 140 is provided. In other words, the shape of the protective cap 140 is a bottomed cylinder. The rear end of the operation dial 130 is housed in the long hole portion 61A. An O-ring 61B is disposed on the inner bottom of the protective cap 140. The O-ring 61B abuts a leg bottom wall 23D of the operation dial 130 located around the outlet 23 (see also FIG. 1C). The O-ring 61B prevents direct contact between the leg bottom wall 23D of the operation dial 130 and the protective cap 140. Thus, damage to the protective cap 140 caused by the operation dial 130 is suppressed.

The inside diameter on the opening side of the protective cap 140 is substantially the same as the outside diameter of the partition wall 41B of the operation dial 130. A female screw S5 extending in the circumferential direction is provided on the inner circumference of the opening side of the protective cap 140. The female screw S5 of the protective cap 140 is screw coupled to the male screw S4 of the operation dial 130. Therefore, the protective cap 140 is attached to and detached from the operation dial 130. In other words, the protective cap 140 is removed from the operation dial 130 and is attached to the operation dial 130. Since the male screw S4 of the operation dial 130 is screw coupled not only to the female screw S5 of the protective cap 140 but also to the female screw S3 of the valve body 120, the male screw S4 is shared by the female screws S3 and S5.

Figure 3A:
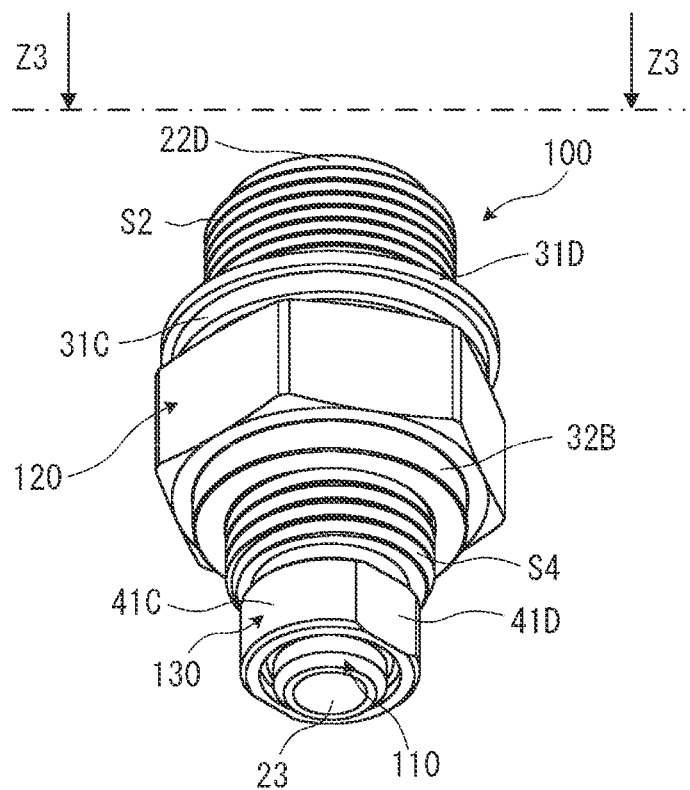
FIG. 3A is a perspective view illustrating an example of the valve closed state of the operation valve according to the first embodiment.
Figure 3B:
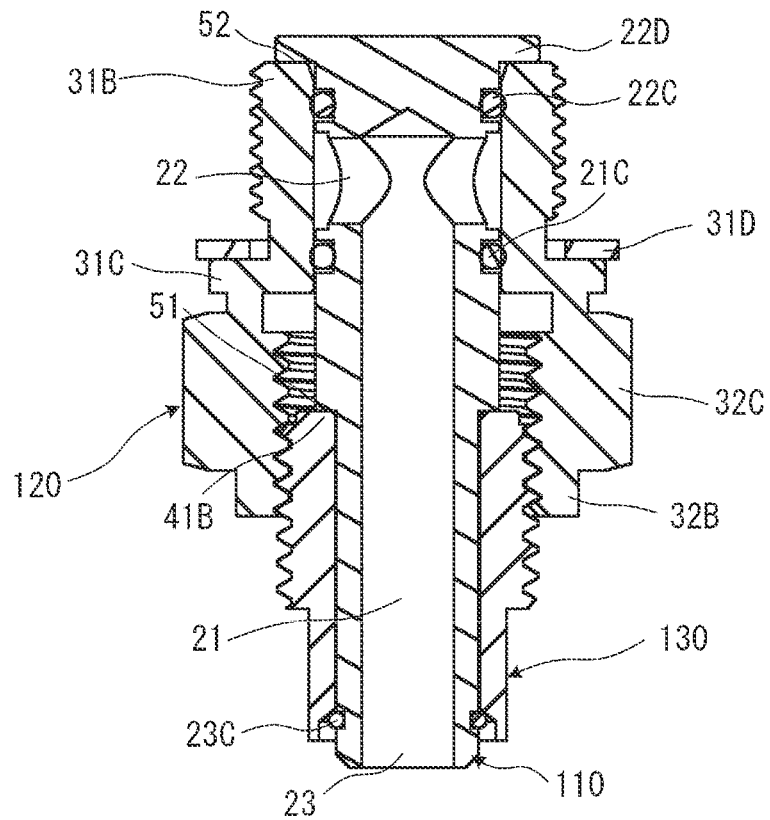
FIG. 3B is a cross-sectional view taken along a line Z3-Z3 and illustrating an example of the valve closed state of the operation valve according to the first embodiment.

When the protective cap 140 is removed from the state in which the protective cap 140 is attached to the operation valve 100 (the state illustrated in FIG. 1C), the operation dial 130 is partially exposed as illustrated in FIGS. 3A and 3B. The protective cap 140 is removed from the operation dial 130 by being rotated counterclockwise in the circumferential direction.

Herein, as illustrated in FIG. 3B, the step 52 (also see FIG. 2B) of the canopy portion 22D in the stick valve 110 is in contact with the partition wall 31B of the valve body 120, and the inlet 22 of the stick valve 110 disappears into the valve body 120. In this way, since the inlet 22 is closed by the valve body 120, urea water is prevented from flowing into the flow path 21. That is, when the inlet 22 disappears into the valve body 120, the operation valve 100 is closed. There is little possibility that urea water enters the inside of the valve body 120 from the contact surface between the canopy portion 22D and the partition wall 31B. However, even if urea water enters, the O-ring 22C prevents urea water from entering the inside of the valve body 120 (specifically, the inlet 22). In this way, when the operation valve 100 is closed, the inflow of urea water from the urea water tank to the inside of the operation valve 100 is stopped.

As illustrated in FIG. 3B, the connection between the stick valve 110 and the operation dial 130 is maintained by the C-ring 23C, whereby the step 51 of the stick valve 110 (see also FIG. 2B) and the top surface of the partition wall 41B of the operation dial 130 come into contact with each other. The relative positional relationship between the stick valve 110 and the operation dial 130 is maintained by the connection by the C-ring 23C and the contact between the stick valve 110 and the operation dial 130. As a result, according to the movement of the operation dial 130, the stick valve 110 is interlocked with the movement of the operation dial 130.

Figure 4A:
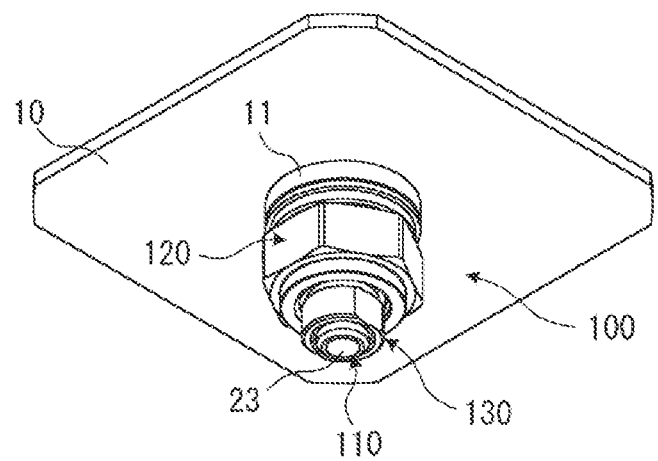
FIG. 4A is a first perspective view illustrating an example of a valve open state of the operation valve according to the first embodiment attached to the bottom wall of the urea water tank.
Figure 4B:
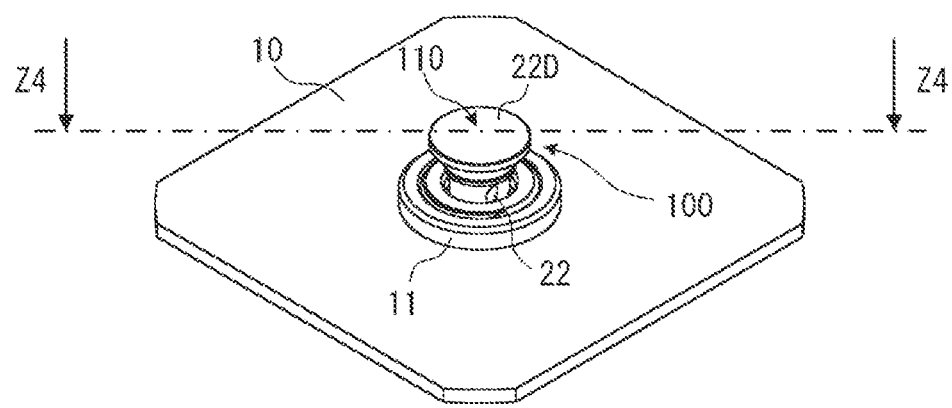
FIG. 4B is a second perspective view illustrating an example of the valve open state of the operation valve according to the first embodiment attached to the bottom wall of the urea water tank.
Figure 4C:
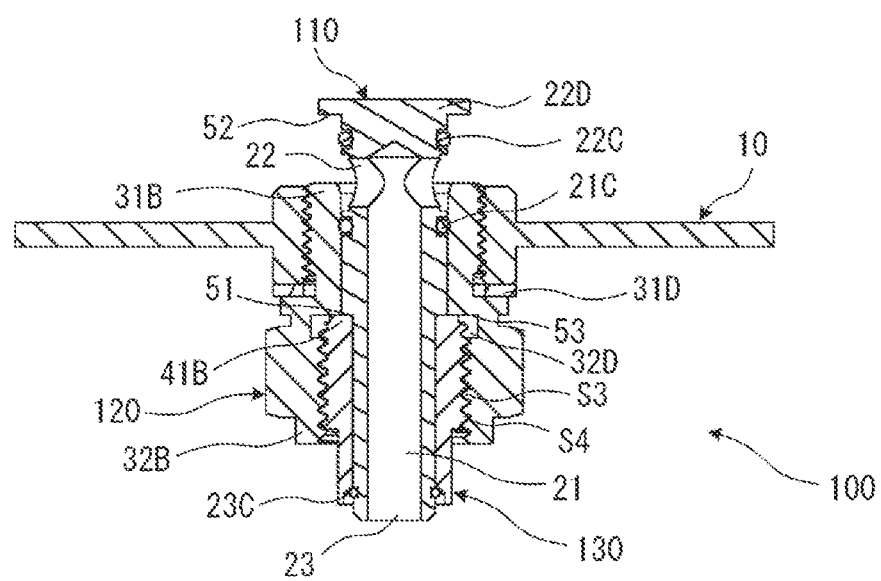
FIG. 4C is a cross-sectional view taken along a line Z4-Z4 and illustrating an example of the valve open state of the operation valve according to the first embodiment attached to the bottom wall of the urea water tank.

As illustrated in FIGS. 4A to 4C, when the operation dial 130 is rotated in the clockwise direction, the screw fastening between the female screw S3 of the valve body 120 and the male screw S4 of the operation dial 130 is tightened, and the operation dial 130 is raised while rotating in the direction of the urea water tank. That is, the operation dial 130 rotates and moves in the extension direction of the stick valve 110.

As illustrated in FIG. 4c, since the step 51 of the stick valve 110 and the top surface of the partition wall 41B of the operation dial 130 are in contact with each other, the operation dial 130 pushes up the stick valve 110 by the upward movement of the operation dial 130. That is, the operation dial 130 drives the stick valve 110 in the extension direction of the stick valve 110. As a result, the canopy portion 22D of the stick valve 110 is separated from the partition wall 31B of the valve body 120, and the inlet 22 appears. As a result, urea water flows into the inlet 22, flows through the flow path 21, and flows out from the outlet 23.

The upward movement of the operation dial 130 is stopped when the top surface of the partition wall 41B of the operation dial 130 comes into contact with the step 53 of the valve body 120 (see also FIG. 2B). Although the operation dial 130 moves while rotating, the stick valve 110 linearly moves independently of the rotation of the operation dial 130. Accordingly, it is possible to suppress deterioration of the two O-rings 21C and 22C attached to the stick valve 110.

Herein, along with the inflow of urea water into the inlet 22, there is little possibility that urea water enters the inside of the valve body 120 from the contact surface between the outer peripheral surface of the stick valve 110 and the inner peripheral surface of the valve body 120. However, even if urea water enters, the O-ring 21C prevents urea water from entering the operation dial 130. In this way, even when the operation valve 100 is opened, it is possible to prevent urea water flowing out from urea water tank from entering the operation dial 130. Therefore, it is possible to avoid a decrease in operability of the operation dial 130 caused by urea water staying and freezing in the third cavity portion 32D or adhering and freezing on the male screw S4 of the operation dial 130.

Although a series of flows from the valve closed state in which the operation valve 100 is closed to the valve open state in which the operation valve 100 is open has been described above, the valve open state can be transitioned to the valve closed state by performing the series of flows in reverse.

For example, when the operation dial 130 is rotated counterclockwise in the circumferential direction, the screw fastening between the female screw S3 of the valve body 120 and the male screw S4 of the operation dial 130 is loosened, and the operation dial 130 is lowered while rotating in a direction away from urea water tank. Since the operation dial 130 is connected to the stick valve 110 via the C-ring 23C, when the operation dial 130 is lowered, the stick valve 110 is also lowered. That is, the operation dial 130 moves the stick valve 110 in a direction in which the inlet 22 disappears into the valve body 120 via the C-ring 23C.

In this way, the inlet 22 appears or disappears from the valve body 120 in accordance with the movement of the operation dial 130. In other words, the inlet 22 appears and disappears from the valve body 120 in accordance with the movement of the operation dial 130.

As described above, the ball valve is excluded from the operation valve 100 according to the first embodiment. In this way, even if there is a possibility that urea water freezes, it is possible to provide the operation valve 100 with a simple structure in which the ball valve is excluded with respect to freezing of urea water.

Second Embodiment

Next, a second embodiment of the present disclosure will be described with reference to FIGS. 5A to 8C. Components similar to those of the operation valve 100 described in the first embodiment are denoted by the same or corresponding reference numerals, and description thereof will be omitted.

Figure 5A:
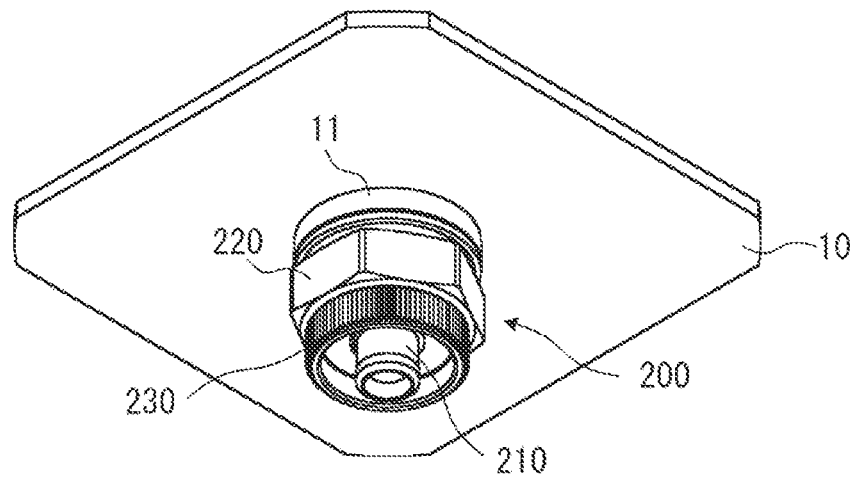
FIG. 5A is a first perspective view illustrating an example of a valve closed state of the operation valve according to a second embodiment attached to the bottom wall of the urea water tank.
Figure 5B:
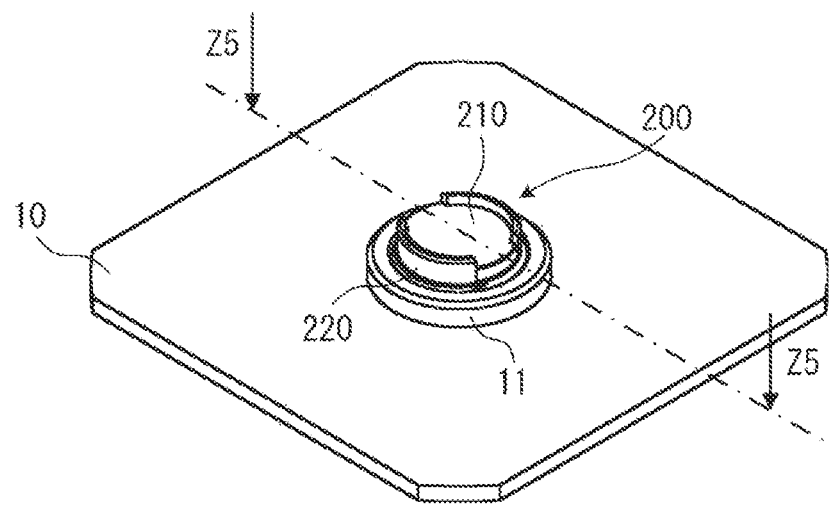
FIG. 5B is a second perspective view illustrating an example of the valve closed state of the operation valve according to the second embodiment attached to the bottom wall of the urea water tank.
Figure 5C:
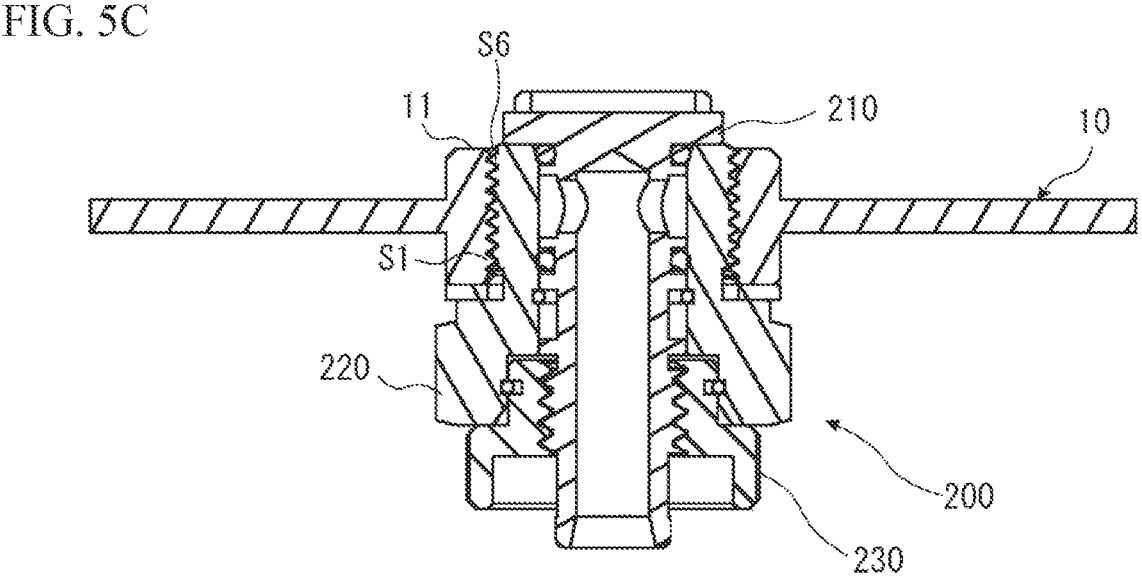
FIG. 5C is a cross-sectional view taken along a line Z5-Z5 and illustrating an example of the valve closed state of the operation valve according to the second embodiment attached to the bottom wall of the urea water tank.

As illustrated in FIGS. 5A to 5C, an operation valve 200 according to the second embodiment is also attached to the drain port 11 provided in the bottom wall 10 of the urea water tank, similarly to the first embodiment. The operation valve 200 includes a stick valve 210, a valve body 220, and an operation dial 230. The valve body 220 is an example of a housing body, and houses a trunk portion of the stick valve 210. As illustrated in FIG. 5C, a male screw S6 is provided on the outer peripheral surface of the distal end portion of the valve body 220. The male screw S6 is screw coupled with the female screw S1 of the drain port 11. Thus, the operation valve 200 can be mechanically attached to the bottom wall 10 of the urea water tank.

The operation valve 200 will be described in detail with reference to FIGS. 6A to 6C.

As illustrated in FIGS. 6A and 6B, the stick valve 210 integrally includes a barrel portion 211, a head portion 212, and a leg portion 213. The head portion 212 is located directly above the barrel portion 211. The leg portion 213 is located immediately below the barrel portion 211. That is, the barrel portion 211 is sandwiched between the head portion 212 and the leg portion 213. As illustrated in FIG. 6a, the shape of the stick valve 210 is cylindrical except for a part of the head portion 212.

The flow path 21 for urea water is provided inside the barrel portion 211. The flow path 21 is also provided inside the leg portion 213. The flow path 21 extends in the same direction as the extension direction of the stick valve 210. The ring groove 21B circulating in the circumferential direction is provided on the barrel side surface 21A located at the front end of the barrel portion 211. The O-ring 21C is attached to the ring groove 21B.

The O-ring 21C is an example of a first sealing ring, and seals the valve body 220 from urea water. The O-ring 21C makes it difficult for urea water to enter the valve body 220. The rear end of the barrel portion 211 has an outer diameter smaller than an outer diameter of the front end of the barrel portion 211. That is, there is the step 51 between the rear end of the barrel portion 211 and the front end of the barrel portion 211.

The head portion 212 is provided with the inlet 22 of the flow path 21. The inlet 22 is provided on the head side surface 22A of the head portion 212. The head side surface 22A is provided with the ring groove 22B extending in the circumferential direction. The O-ring 22C is attached to the ring groove 22B. The O-ring 22C is an example of a second sealing ring, and seals the valve body 220 from urea water. The two O-rings 21C and 22C make it extremely difficult for urea water to enter the inside of the valve body 220. That is, it is possible to prevent or suppress the infiltration of urea water into the valve body 220. The canopy portion 22D having a disc shape is provided at the front end of the head portion 212. The canopy portion 22D has an outer diameter that is greater than the outer diameter of the rear end of the head portion 212. Therefore, there is the step 52 between the front end of the head portion 112 and the rear end of the head portion 112.

As illustrated in FIG. 6A, unlike the first embodiment, the canopy portion 22D according to the second embodiment is integrally provided with two overhanging portions 22E facing each other with respect to the center of the canopy portion 22D. Therefore, the step 52 is continuous from the canopy portion 22D to the overhanging portion 22E. Both side surfaces of the two overhanging portions 22E are curved in an arc shape, and the thicknesses of the two overhanging portions 22E are the same as the thicknesses of the canopy portion 22D. As will be described in detail later, the two overhanging portions 22E are housed between two arc walls 31E provided at the distal end of the valve body 220 so as to be spaced apart from each other.

The flow path 21 of the barrel portion 211 extends inside the leg portion 213. Unlike the first embodiment, a protrusion 23E having the same outer diameter as the outer diameter of the barrel side surface 21A is provided on the front end side surface of the leg portion 213. Therefore, the side surface of the leg portion 213 is not flatly continuous to the side surface of the rear end of the barrel portion 211. The outlet 23 of the flow path 21 is provided on a bottom surface of the leg portion 213. A male screw S7 extending in the circumferential direction is provided on the leg side surface 23A of the leg portion 213 located between the protrusion 23E and the outlet 23. Although the details will be described later, the male screw S7 is screw coupled to a female screw S8 provided inside the operation dial 230.

The valve body 220 integrally includes a valve housing portion 221 and a dial housing portion 222. The valve housing portion 221 has the first cavity portion 31A having a cylindrical shape and extending in the same direction as the central axis direction of the valve body 220. That is, the valve housing portion 221 has a cylindrical shape. For this reason, the valve housing portion 221 has the partition wall 31B that separates the inside and the outside of the valve housing portion 221. The inside diameter of the partition wall 31B is substantially the same as the outside diameters of the barrel side surface 21A and the protrusion 23E. Therefore, the barrel portion 211 of the stick valve 210 can be inserted into the first cavity portion 31A.

A tapered surface 31G is provided on the inner peripheral surface located at the front end of the partition wall 31B. The two walls 31E each having an arc shape are provided on the top surface located at the front end of the partition wall 31B. The extension direction of the two arc walls 31E is the same as the extension direction of the valve body 220. The two arc walls 31E are equally spaced apart in the circumferential direction. Therefore, there are two gaps between the two arc walls 31E. One of the two overhanging portions 22E described above is housed in one of the gaps, and the other of the two overhanging portions 22E described above is housed in the other of the gaps.

The gasket mounting portion 31C is provided at the rear end of the partition wall 31B. The gasket 31D having a ring shape is mounted on the gasket mounting portion 31C. Accordingly, it is possible to suppress leakage of urea water when the operation valve 100 is attached to the urea water tank. A ring groove 31F is provided on the inner peripheral surface of the rear end of the partition wall 31B. A C-ring 23G is attached to the ring groove 31F. As will be described in detail later, the C-ring 23G restricts the amount of movement of the stick valve 210. By regulating the amount of movement of the stick valve 210, it is possible to accurately control the integral movement of the canopy portion 22D and the overhanging portion 22E of the stick valve 210. In other words, opening and closing of the stick valve 210 can be controlled with high accuracy.

The inside of the dial housing portion 222 includes the second cavity portion 32A and a fifth cavity portion 32E each having a columnar shape extending in the same direction as the central axis direction of the valve body 220. The fifth cavity portion 32E is located at the distal end of the dial housing portion 222. The fifth cavity portion 32E is continuous with the first cavity portion 31A located below the ring groove 31F. That is, the fifth cavity portion 32E is located immediately below the first cavity portion 31A. The outer diameter of the fifth cavity portion 32E is the same as the outer diameter of the first cavity portion 31A. The second cavity portion 32A has an outer diameter greater than an outer diameter of the fifth cavity portion 32E.

The dial housing portion 222 has a cylindrical shape. For this reason, the dial housing portion 222 has the bolt portion 32C that separates the inside and the outside of the dial housing portion 222. The bolt portion 32C is provided integrally with the partition wall 31B. Since the second cavity portion 32A has a larger outer diameter than the fifth cavity portion 32E, there is a step 55 between the bolt portion 32C of the dial housing portion 222 and the partition wall 31B of the valve housing portion 221. The valve body 220 can be attached to the bottom wall 10 of the urea water tank by holding the bolt portion 32C with two fingers and rotating the valve body 220 clockwise.

The inner circumferential surface of the bolt portion 32C corresponding to the second cavity portion 32A is provided with a ring groove 32F extending in the circumferential direction. A C-ring 23F is attached to the ring groove 32F. As will be described in detail later, the C-ring 23F fixes the position of the operation dial 230 and restricts operations other than the rotation of the operation dial 230.

The operation dial 230 includes a coupling portion 231 having a bottomless cylindrical shape. The operation dial 230 includes an operation portion 232 having a bottomed cylindrical shape and extending in the same direction as the extension direction of the stick valve 210. The operation dial 230 integrally includes the coupling portion 231 and the operation portion 232. The coupling portion 231 and the operation portion 232 have different outer diameters. Specifically, the outer diameter of the coupling portion 231 is smaller than the outer diameter of the operation portion 232. In addition, the coupling portion 231 and the operation portion 232 have different inner diameters. Specifically, the inner diameter of the coupling portion 231 is smaller than the inner diameter of the rear end side of the operation portion 232. The inner diameter of the distal end side of the operation portion 232 is the same as the inner diameter of the coupling portion 231. For this reason, the operation portion 232 has a bottom portion formed into a disc shape and having an opening at a central portion thereof.

The coupling portion 231 may be coupled to the dial housing portion 222. The operation portion 232 is operated to open and close the stick valve 210. For example, the stick valve 210 can be opened or closed by holding the operation portion 232 between two fingers and rotating it clockwise or counterclockwise.

A female screw S8 is provided on an inner peripheral surface of the coupling portion 231. A female screw S8 is also provided on the inner peripheral surface of the distal end side of the operation portion 232. The leg portion 213 of the stick valve 210 is partially inserted into the coupling portion 231 and the operation portion 232, and the male screw S7 of the leg portion 213 is screw coupled to the female screw S8 of the coupling portion 231 and the operation portion 232. A ring groove 41E is provided on the outer peripheral surface of the coupling portion 231. The C-ring 23F described above is attached to the ring groove 41E. That is, the C-ring 23F is sandwiched between the ring groove 41E and the ring groove 32F. As described above, by attaching the C-ring 23F to both the ring groove 41E of the coupling portion 231 and the ring groove 32F of the dial housing portion 222, the position of the operation dial 230 is fixed and the operation other than the rotation of the operation dial 230 is regulated.

Figure 7A:
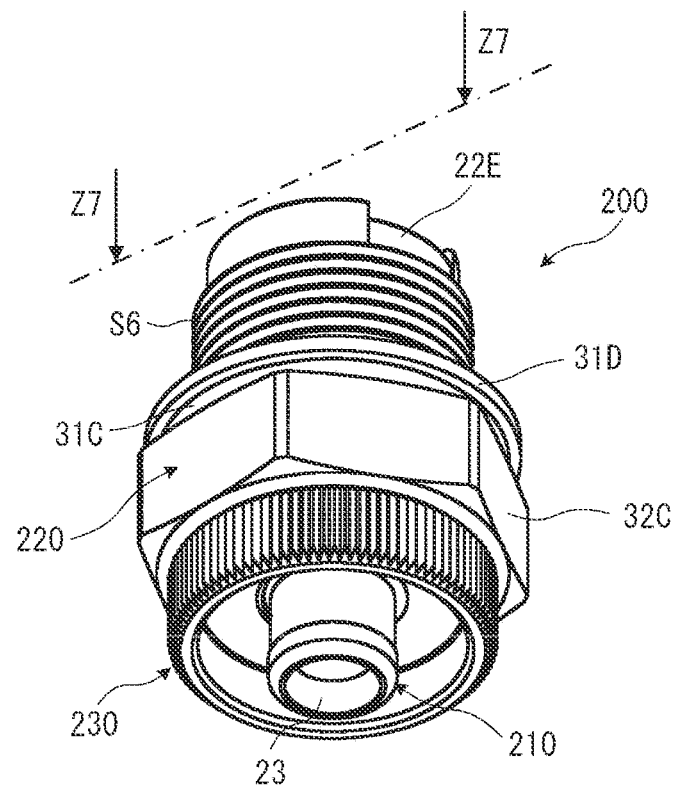
FIG. 7A is a perspective view illustrating an example of the valve closed state of the operation valve according to the second embodiment.
Figure 7B:
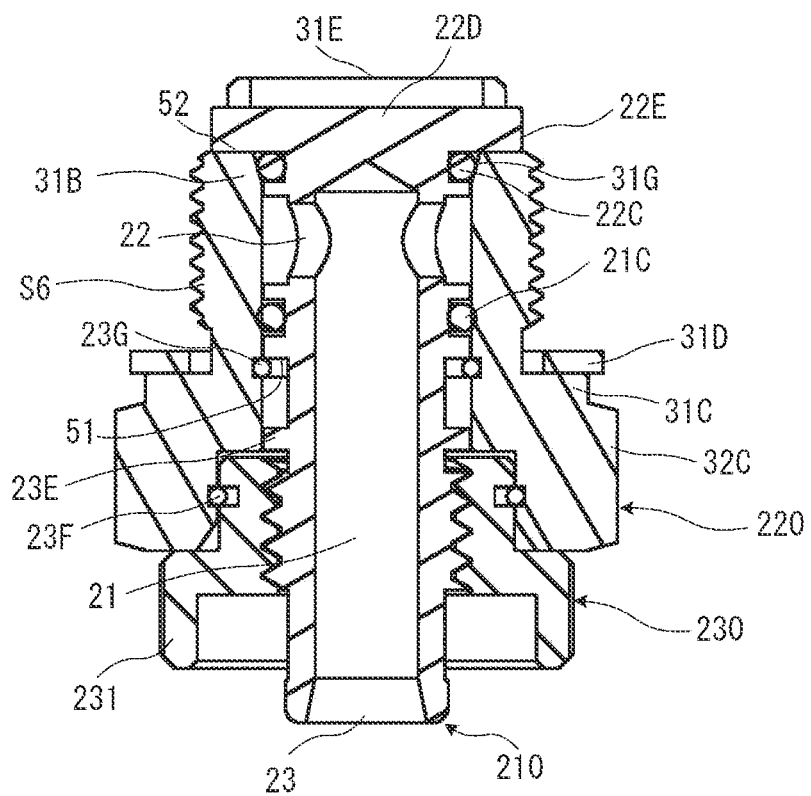
FIG. 7B is a cross-sectional view taken along a line Z7-Z7 and illustrating an example of the valve closed state of the operation valve according to the second embodiment.

Herein, as illustrated in FIGS. 7A and 7B, in a state where the stick valve 210 is closed, the canopy portion 22D and the overhanging portion 22E are positioned at a height lower than the height of the arc wall 31E. In this state, as illustrated in FIG. 7B, the step 52 extending over one or both of a part of the canopy portion 22D and the overhanging portion 22E comes into contact with the top surface of the partition wall 31B. Accordingly, the inlet 22 of the stick valve 210 disappears into the valve body 220. In this way, since the inlet 22 is closed by the valve body 220, urea water is prevented from flowing into the flow path 21. That is, when the inlet 22 disappears into the valve body 220, the operation valve 200 is closed.

In addition, as illustrated in FIG. 7B, in a state where the stick valve 210 is closed, the O-ring 22C stops on the tapered surface 31G of the partition wall 31B. Therefore, as compared with the case where the O-ring 22C gets into the first cavity portion 31A as in the first embodiment, the operation for closing the stick valve 210 can be performed with a light force. Further, in a state where the stick valve 210 is closed, the step 51 and the C-ring 23G are in contact with each other. Herein, as described above, the step 52 and the top surface of the partition wall 31B come into contact with each other, so that the downward movement of the stick valve 210 can be restricted. On the other hand, the downward movement of the stick valve 210 can also be restricted by the contact between the step 51 and the C-ring 23G. The lower side of the stick valve 210 is a direction in which the stick valve 210 moves away from the urea water tank.

Figure 8A:
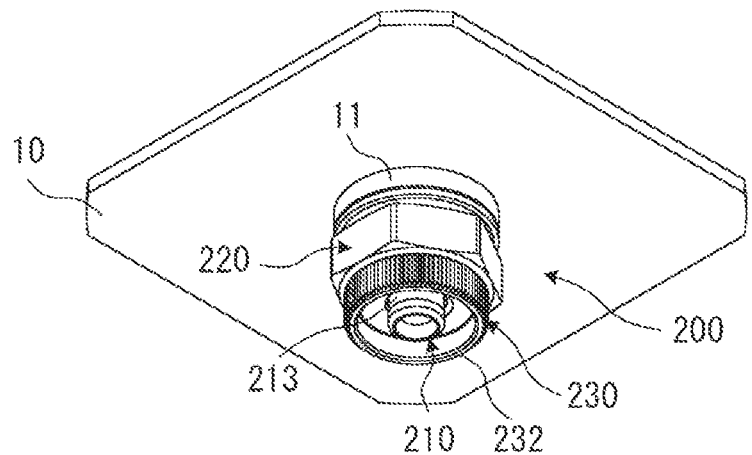
FIG. 8A is a first perspective view illustrating an example of a valve open state of the operation valve according to the second embodiment attached to the bottom wall of the urea water tank.
Figure 8B:
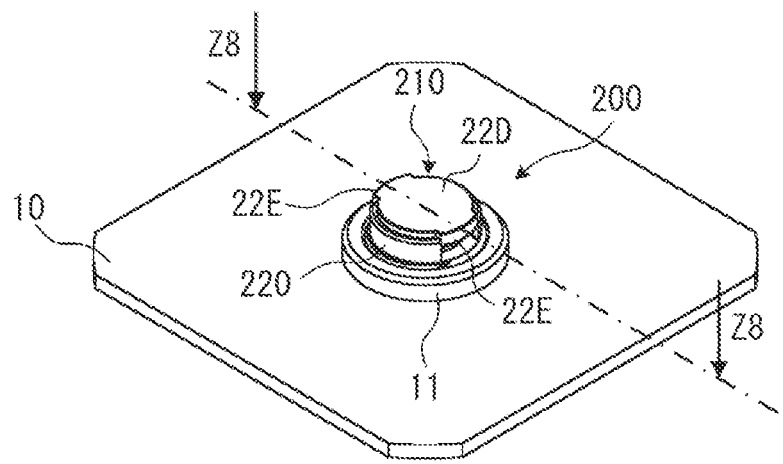
FIG. 8B is a second perspective view illustrating an example of the valve open state of the operation valve according to the second embodiment attached to the bottom wall of the urea water tank.
Figure 8C:
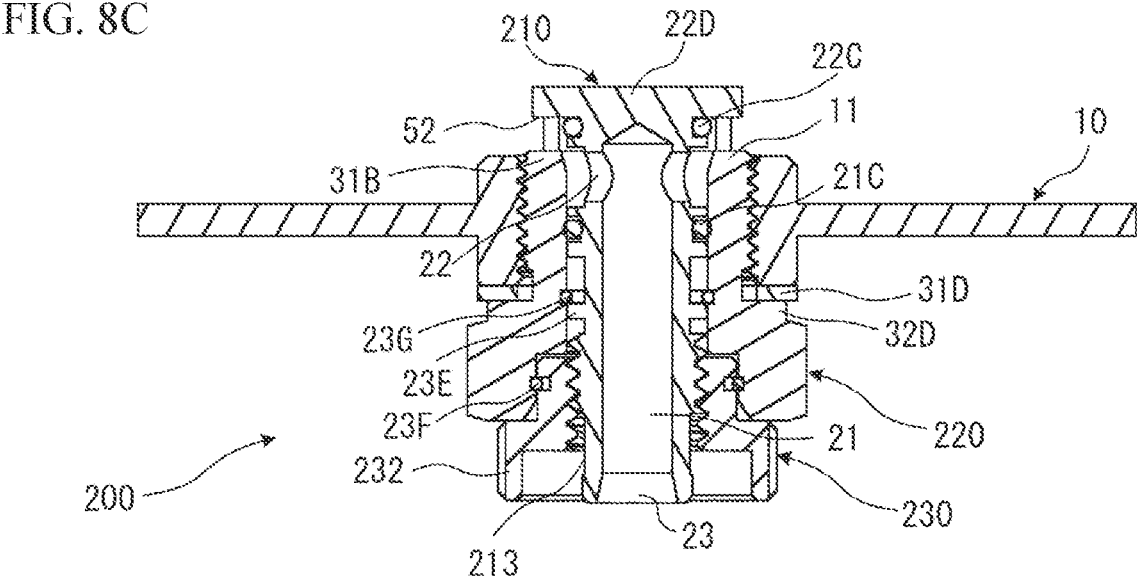
FIG. 8C is a cross-sectional view taken along a line Z8-Z8 and illustrating an example of the valve open state of the operation valve according to the second embodiment attached to the bottom wall of the urea water tank.

When the operation dial 230 is rotated clockwise in a state in which the stick valve 210 is closed, the male screw S7 of the stick valve 210 and the female screw S8 of the operation dial 230 are screw coupled to each other, so that the stick valve 210 moves toward the urea water tank. As a result, as illustrated in FIGS. 8A to 8C, the stick valve 210 is opened. Since the overhanging portion 22E is housed between the two walls 31E each having an arc shape, even if the operation dial 230 is rotated clockwise, the rotation of the overhanging portion 22E is restricted, and the overhanging portion 22E moves upward while being guided by the two walls 31E each having an arc shape. As described above, the stick valve 210 linearly moves upward independently of the rotation of the operation dial 230. Since the stick valve 210 linearly moves upward, it is possible to suppress deterioration of the two O-rings 21C and 22C attached to the stick valve 210. Specifically, it is possible to suppress deterioration of the O-rings 21C and 22C compared to a case where the O-rings 21C and 22C move upward while rotating.

In a state where the stick valve 210 is opened, the canopy portion 22D and the overhanging portion 22E are positioned at the same height as the height of the arc wall 31E. Specifically, as illustrated in FIGS. 8B and 8C, a part of the canopy portion 22D and the step 52 continuous to the overhanging portion 22E separate from the top surface of the partition wall 31B. As a result, the inlet 22 of the stick valve 210 is opened. When the inlet 22 is opened in this way, urea water flows into the flow path 21 through the inlet 22. That is, when the inlet 22 is opened, the operation valve 200 is opened.

In addition, in a state where the stick valve 210 is opened, the top surface (or the side surface) of the protrusion 23E and the C-ring 23G abut against each other. Thus, the upward movement of the stick valve 210 can be restricted. The upper side of the stick valve 210 is a direction in which the stick valve 210 approaches the urea water tank.

Herein, as illustrated in FIGS. 8A and 8C, the inner circumferential surface on the rear end side of the operation portion 232 of the operation dial 230 is spaced away from the outer circumferential surface of the leg portion 213 of the stick valve 210. In the first embodiment, the curved surface 41C or the flat surface 41D of the operation dial 130 is held between two fingers to rotate the operation dial 130 (see FIG. 3A). At this time, the fingers may come into contact with the male screw S4 of the operation dial 130 to cut the skin of the fingers, for example. Further, in the first embodiment, since the curved surface 41C and the flat surface 41D of the operation dial 130 are close to the outlet 23 of the stick valve 110, there is a possibility that the fingers are stained with urea water solution.

However, according to the second embodiment, since the inner peripheral surface of the operation portion 232 of the operation dial 230 is spaced away from the outer peripheral surface of the leg portion 213 of the stick valve 210, these possibilities can be avoided. That is, according to the second embodiment, it is possible to reduce the possibility that the skin of the finger is cut and the possibility that the finger is stained with urea water. In addition, since the outer diameter of the operation dial 230 is larger than the outer diameter of the operation dial 130 according to the first embodiment, the operability of the operation dial 230 is improved as compared with the operation dial 130.

As described above, the ball valve is also excluded from the operation valve 200 according to the second embodiment. In this way, even if there is a possibility that urea water freezes, it is possible to provide the operation valve 200 with a simple structure excluding the ball valve with respect to the freezing of urea water. In the above description, a series of flows from the valve closed state in which the operation valve 200 is closed to the valve open state in which the operation valve 200 is opened has been described. However, by reversely performing the series of flows, it is possible to transition from the valve open state to the valve closed state.

Although some embodiments of the present disclosure have been described in detail, the present disclosure is not limited to the specific embodiments but may be varied or changed within the scope of the present disclosure as claimed.

For example, as a material of the stick valves 110 and 210, the valve bodies 120, and 220, and the operation dials 130 and 230, it is desirable to use stainless steel (for example, SUS 316) having strong corrosion resistance in order to cope with urea water. On the other hand, since the operation dials 130 and 230 are not in direct contact with urea water, a resin may be used from the viewpoint of weight reduction. The protective cap 140 may be made of stainless steel or resin.

In the above-described embodiment, urea water is used as an example of the fluid. However, the fluid may be drinking water or a flammable or non-flammable gas. Examples of the drinking water include water, soft drinks, alcoholic beverages and the like. In this case, instead of the urea water tank, a container for drinking water or gas may be adopted as an attachment target of the operation valves 100 and 200.

What is claimed is:

1. An operation valve comprises:
    a valve formed into a rod shape and including a barrel portion in which a flow path for a fluid is provided, a head portion in which an inlet of the flow path is provided, and a leg portion in which an outlet of the flow path is provided;
    a housing body housing the barrel portion;
    an operation dial coupled to the housing body and driving the valve in an extension direction of the valve; and
    a second sealing ring sealing the housing body from the fluid, moving with the inlet in accordance with rotation of the operation dial and provided on a head side surface of the head portion, wherein
    the leg portion is inserted into an inside of the operation dial.

2. The operation valve according to claim 1, wherein
    the operation dial drives the valve in the extension direction, a position of the operation dial being fixed and operations being restricted other than the rotation of the operation dial, and
    the inlet is provided on a head side surface of the head portion, and appears and moves from the housing body in accordance with the rotation of the operation dial.

3. The operation valve according to claim 1, further comprising a coupling ring that couples the leg portion and the operation dial,
    wherein the operation dial drives the valve in a direction in which the inlet moves into the housing body by use of the coupling ring.

4. The operation valve according to claim 1, further comprising a first scaling ring sealing the operation dial from the fluid and provided on a barrel side surface of the barrel portion.

5. The operation valve according to claim 1, further comprising a protective cap protecting a dial side surface and a dial bottom surface of the operation dial and being attachable to and detachable from the operation dial.

6. The operation valve according to claim 1, wherein
    the housing body includes a partition wall separating an inside and an outside of the housing body,
    the partition wall includes a tapered surface on an inner peripheral surface of a distal end, and
    when the inlet moves into the housing body, the second sealing ring stops on the tapered surface.

7. The operation valve according to claim 1, wherein
    the operation dial includes an operation portion formed into a cylindrical shape and extending in a same direction as the extension direction, and
    an inner peripheral surface of the operation portion is spaced away from an outer peripheral surface of the leg portion.

8. The operation valve according to claim 1, wherein
    the operation dial moves in the extension direction while rotating and drives the valve in the extension direction.

9. The operation valve according to claim 1, wherein the operation dial is in contact with the valve.

10. The operation valve according to claim 1, wherein an operation portion of the operation dial is provided closer to the outlet than the inlet.

11. An operation valve, comprising:
    a valve formed into a rod shape and including a barrel portion in which a flow path for a fluid is provided, a head portion in which an inlet of the flow path is provided, and a leg portion in which an outlet of the flow path is provided;
    a housing body housing the barrel portion;
    an operation dial coupled to the housing body and driving the valve in an extension direction of the valve; and
    a second sealing ring sealing the housing body from the fluid, moving with the inlet in accordance with rotation of the operation dial and provided on a head side surface of the head portion, wherein the housing body has a dial housing portion that houses one end of the operation dial between an operation portion that is included in the other end of the operation dial and a bottom wall of a tank that stores the fluid, the operation valve being attached to the tank.

* * * * *